United States Patent
Ravindranath et al.

(10) Patent No.: US 7,136,469 B1
(45) Date of Patent: Nov. 14, 2006

(54) SERVICE SELECTION GATEWAY (SSG) SUPPORTING TARIFF CHANGES FOR TRAFFIC VOLUME

(75) Inventors: Vinodh Kumar Ravindranath, Bangalore (IN); Navneet Agarwal, Bangalore (IN); Marco Cesare Centemeri, Rho (IT); Amit S. Phadnis, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 21 days.

(21) Appl. No.: 10/614,611

(22) Filed: Jul. 8, 2003

(51) Int. Cl.
*H04M 15/00* (2006.01)
*H04L 12/66* (2006.01)
(52) U.S. Cl. .................... 379/114.01; 379/114.07; 379/124; 379/128; 370/352
(58) Field of Classification Search ........... 379/114.02, 379/114.01, 114.03, 112.07, 114.28, 121.04, 379/124, 126, 128, 133, 137, 139, 114.07; 370/238, 238.1, 352, 395.21, 472, 473
See application file for complete search history.

(56) References Cited

U.S. PATENT DOCUMENTS

| | | | |
|---|---|---|---|
| 5,519,769 A * | 5/1996 | Weinberger et al. ... | 379/114.02 |
| 5,862,203 A * | 1/1999 | Wulkan et al. ........ | 379/114.02 |
| 5,870,460 A * | 2/1999 | Litzenberger .......... | 379/114.02 |
| 5,956,391 A * | 9/1999 | Melen et al. .......... | 379/114.01 |
| 6,366,560 B1 * | 4/2002 | Ohiwane et al. ........... | 370/238 |
| 6,442,135 B1 * | 8/2002 | Ofek .......................... | 370/229 |
| 6,473,404 B1 * | 10/2002 | Kaplan et al. ............. | 370/238 |
| 6,539,082 B1 * | 3/2003 | Lowe et al. .......... | 379/114.28 |
| 6,741,685 B1 * | 5/2004 | Zanaty .................. | 379/114.01 |
| 6,829,234 B1 * | 12/2004 | Kaplan et al. .............. | 370/352 |

OTHER PUBLICATIONS

Entitled:"Node Route Processor—Service Selection Gateway Enhancements II", Published on: Mar. 26 14:56:36 PST2000, Available at: http://www.cisco.com/univercd/cc/td/doc/product/software/ios122/122newft/122limit/122b/122b_4/122b4_sg, (pp. 17).
Entitled:"Data Sheet: Cisco Service Selection Gateway", Published on: Oct. 7 21:07:17 PDT 2001, Available at: http://www.cisco.com/warp/public/cc/pd/as/6400/prodlit/ssgw_ds.htm, ( pp. 3).
Entitled:"Cisco Subscriber Edge Services Manager", Published on: Dec. 14 14:18:38 PST 2001, Available at: http://www.cisco.com/warp/public/cc/pd/as/6400/prodlit/esvmn_ov.htm , (pp. 9).
Entitled:"Service Selection Gateway", Published on: Feb. 25 21:23:17 PST 2002, Available at: http://www.cisco.com/univercd/cc/td/doc/product/dsl_prod/6400/feat_gd/12_2_2/fg2_ssg.htm, (pp. 82).

(Continued)

*Primary Examiner*—Quoc Tran
(74) *Attorney, Agent, or Firm*—Narendra Reddy Thappeta (57) ABSTRACT

A service selection gateway (SSG) which receives data indicating tariff switching points, and sends accounting records enabling accurate computation of traffic volumes in each switching duration is described. In one embodiment, a counter value indicating the traffic volume for each tariff duration is sent. In an alternative embodiment, at least one accounting record containing two counters is sent in each duration, with one counter indicating an aggregate count of traffic volume (e.g., since the subscriber started a session) and another counter containing a marginal (or incremental) value since a switching point. Such an accounting record can be sent at any time point in a tariff duration, and the traffic volume in each tariff duration can be computed accurately.

40 Claims, 5 Drawing Sheets

OTHER PUBLICATIONS

Pending U.S. Appl. No. 10/382,347, filed Mar. 4, 2003, Entitled:"Method and Apparatus Providing Prepaid Billing for Network Services Using Explicit Service Authorization in an Access Server", Pruss et al., (pp. 94).

Entitled:"SSG Prepaid"; Cisco IOS Release12.2(4)B, Downloaded on Apr. 29, 2003; Available at: http://www.cisco.com/en/US/products/sw/losswrel/ps5012/products_feature_guide_chapter09186a008008774d.html, (pp. 12).

Entitled:"Trunk Services"; Bangalore Telephone Directory2002-2003; p. IP-42; Available from: www.bsnl.co.in ;(pp. 2).

* cited by examiner

SERVICE SELECTION GATEWAY (SSG) SUPPORTING TARIFF CHANGES FOR TRAFFIC VOLUME

RELATED APPLICATION

The present application is related to the commonly owned co-pending U.S. patent application Ser. No. 10/418,719, entitled, "Flexible Billing Support in a Service Selection Gateway (SSG)", filed on: Apr. 18, 2003, naming as inventors Ravindranath et al.

BACKGROUND OF THE INVENTION

1. Field of the Invention

The present invention relates to telecommunication networks, and more specifically to a service selection gateway (SSG) which supports tariff changes for traffic volume.

2. Related Art

Service selection gateways (SSG) generally refer to network switches/routers which allow a subscriber to selectively access various services on the Internet. In one common environment, an access provider (e.g., an internet service provider or a shop providing the subscriber terminals to access the services) controls the services a subscriber is permitted to access, and bills the subscriber for accessing/using the services.

In an approach generally referred to as a postpaid model, a subscriber is permitted to access various services and charged later (for example, after termination of a session, monthly, weekly, etc.) for the traffic volume transferred. The traffic volume may specify the number of bytes sent and/or received.

A prior SSG may be designed to support a constant tariff for traffic volume. In general, a tariff refers to a schedule of prices for a unit of each resource used, and a constant tariff implies that the prices are fixed. In such a model, a SSG may send accounting records (either periodically or at the end of a session) indicating traffic volume. The accounting records may be stored in a database and the subscriber may be charged later based on the stored records.

BRIEF DESCRIPTION OF THE DRAWINGS

The present invention will be described with reference to the accompanying drawings, wherein.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

1. Overview

A service selection gateway (SSG) provided according to an aspect of the present invention receives data representing various tariff switching points (i.e., the time point at which tariff changes), and sends accounting records indicating traffic volume up to or after each switching point. The accounting records can be used to charge subscribers according to the corresponding varying tariff. Thus, for example, a service provider may charge more when an access network is likely to be used more and less in other durations.

In one embodiment, a SSG sends an accounting record indicating the traffic volume for an entire duration with constant tariff. Thus, assuming that a user accesses service(s) an entire day and three different tariffs are applicable in a day, three accounting records may be generated indicating the traffic volume in each of the three durations.

One problem with such an embodiment is that the SSG may have to perform substantial amount of processing (e.g., to send accounting records) at switching points. The amount of processing may be particularly unacceptably high when a SSG has to support many (e.g., several thousands) of subscribers.

In an alternative embodiment, a SSG sends two counts associated with each subscriber (or service or connection), with one count ("aggregate count") indicating the total traffic volume since the start of a session and another count ("marginal count") indicating the traffic volume since the last switching point. The two counts are sent at least once in each tariff duration (i.e., between two switching points). The two counts can be used to accurately determine the traffic volume in each tariff duration, and the subscriber may be charged according to the varying tariffs as desired.

In one implementation of an SSG sending both aggregate count and marginal count, the SSG may maintain the corresponding two counters, which are both updated upon forwarding each packet. One problem with such an implementation is that, the overhead of updating both the counters (for every packet) may be unacceptably high. Accordingly, in an alternative implementation, an SSG maintains only one counter internally and the counter values (counts) are stored at each switching point. The marginal count may be computed by subtracting the stored counter value at the prior switching point from the aggregate counter value at the time of sending the accounting record.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well known structures or operations are not shown in detail to avoid obscuring the invention.

2. Example Environment

Figure 1:
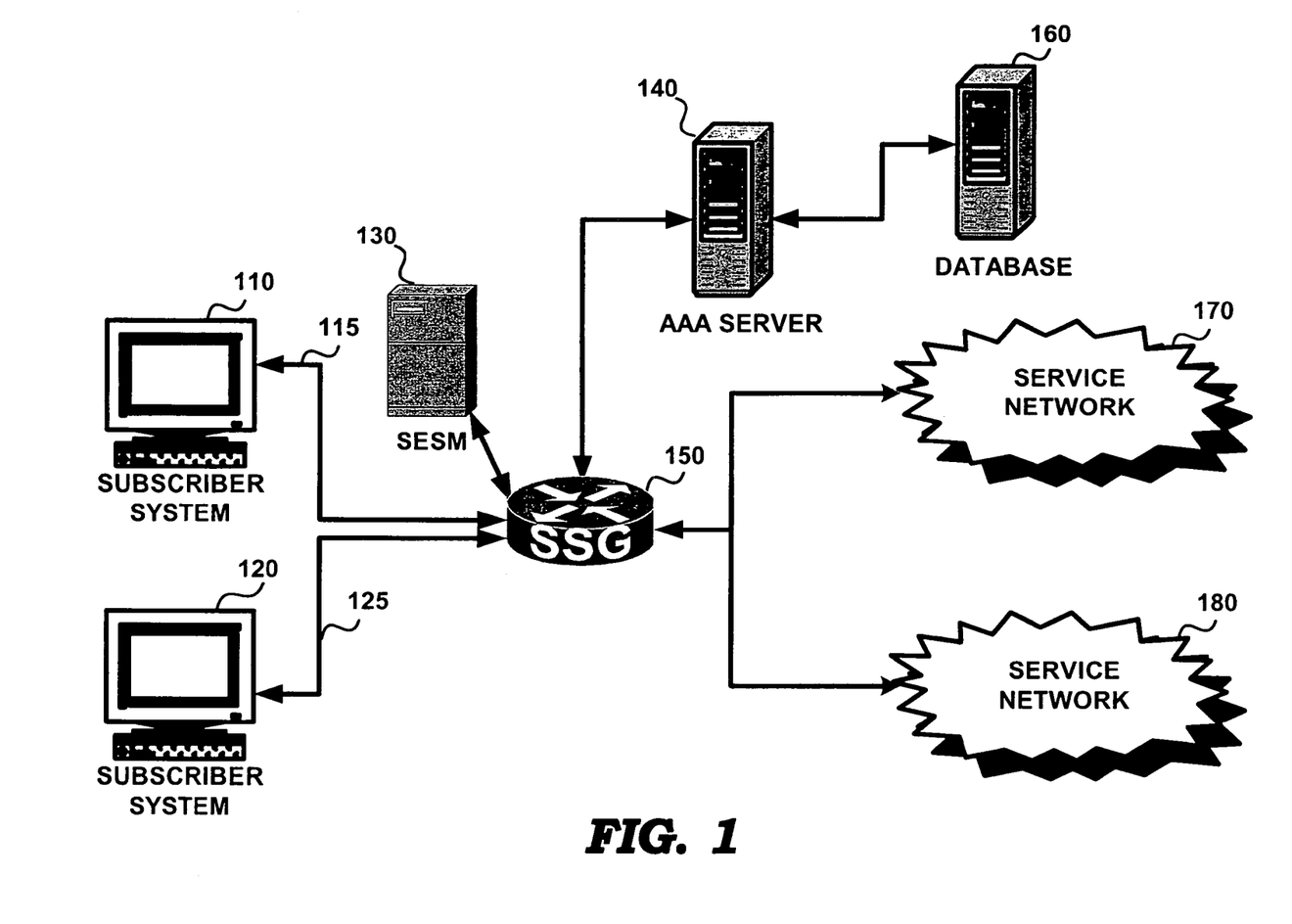
FIG. 1 is a block diagram illustrating an example environment in which the present invention can be implemented.

FIG. 1 is a block diagram illustrating an example environment in which the present invention can be implemented. The environment is shown containing subscriber systems 110 and 120, subscriber edge service manager (SESM) 130, authentication, authorization and accounting (AAA) server 140, service selection gateway (SSG) 150, database 160, and service networks 170 and 180. Each system is described in further detail below.

Service networks 170 and 180 typically contain many servers (not shown) such as web servers, application servers and network devices (e.g., routers), which together provide various services (e.g., video applications, database applications, teleconferencing, etc.). Merely for simplicity, it is assumed that a user need not be authenticated for individual services. However, alternative embodiments may be implemented to extend the user interface to require a user to send specific information required for authentication for the specific service as well.

Each of subscriber systems 110 and 120 represents a system such as a personal computer (PC) often connected to internet using technologies such as DSL and dial-up connections on path 115. A subscriber may access services provided in the servers present in service networks 170 and 180 using subscriber systems 110/120. As described below, an aspect of the present invention enables subscribers to be billed with varying tariffs for the traffic volume (bytes sent/received) generated due to accessing such services.

SESM 130 provides an interface for a subscriber to send any necessary information (e.g., user identifier and password) for authenticating the subscriber. The provided information is sent to AAA server 140 by SSG 150. An authentication confirmation message from AAA server 140 may further indicate a list of services the subscriber is allowed to access. SESM 130 may then enable the subscriber to select the desired service(s) of interest by a suitable interface, for example, by sending a HTML page to a web browser executing on subscriber system 110/120. SESM 130 indicates the selected service along with the subscriber identification to SSG 150. Alternatively the user may be logged on to certain services by default without explicit service selection required at SESM 130.

AAA server 140 receives accounting records related to various subscribers and stores the contained information in database 160. The accounting records can be used to charge subscribers for traffic volumes using varying tariffs. AAA server 140 may be used to send data representing switch-over points between different tariffs, as also described in sections below with examples.

In addition, AAA server 140 authenticates the subscriber based on information received from SESM 130. AAA server 140 then sends a response containing a list of services (with corresponding service identifiers) the subscriber is permitted to access to SSG 150. AAA server 140 may be implemented based on RFC-2865, entitled, "Remote Authentication Dial In User Service (RADIUS)", available from the Internet Engineering Task Force.

SSG 150 forwards packets between various systems (subscriber systems 110/120, SESM 130 and AAA server 140) when the subscriber is being authenticated and when the subscriber selects a service of interest to access. SSG 150 may thus receive a subscriber identifier and a service identifier(s) from SESM 130. SSG 150 enables subscriber to access various services (including those specified by SESM and any others accessible by all/group).

An aspect of the present invention enables accurate billing of subscribers for traffic volume according to tariffs which change by time. The feature(s) may be appreciated by understanding the operation of a prior system which may not provide one or more of such features. Accordingly such a prior embodiment is described below.

3. Prior System Not Providing One or More of Features of the Present Invention A prior SSG may send accounting records (for a subscriber, connection or service) containing traffic volume to an AAA server periodically (e.g., every 15 minutes) without regard to tariff switching points. One problem with such an embodiment is that a single accounting record may have a count representing a traffic volume transferred in two (or multiple, in general) tariff durations (i.e., having different charges), and it may not be possible to accurately determine the portion of the traffic volume transferred in each of the durations corresponding to the different tariffs.

As a result, the charges to a customer may not precisely reflect the volumes of traffic transferred in the respective tariff durations, which may be undesirable at least in some situations. An aspect of the present invention enables a SSG to accurately charge subscribers according to desired tariff changes, as described below in further detail with reference to examples.

4. Method

Figure 2:
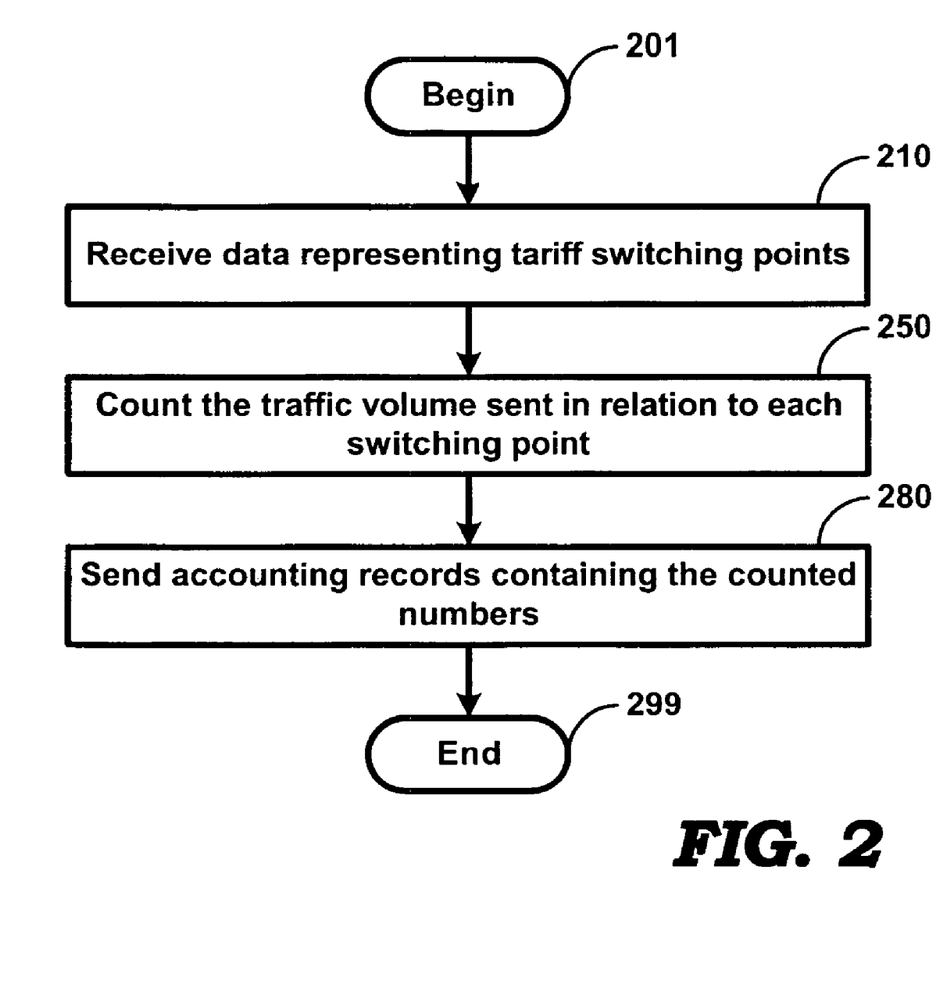
FIG. 2 is a flow chart illustrating a method by which SSG supports tariff changes in postpaid service in an embodiment of the present invention.

FIG. 2 is a flow chart illustrating a method using which a SSG may support tariff changes associated with different times of access of a service according to an aspect of the present invention. The flow-chart is described with reference to the systems of FIG. 1 for illustration. Various aspects of the invention can be implemented in other environments as well. The method begins in step 201, in which control immediately passes to step 210.

In step 210, SSG 150 receives data representing tariff switching points, i.e., the time points at which tariffs change. The switching points may be represented using one of several approaches. In one embodiment, specific time points (such as 8.00 AM, 9.00 PM and 1.00 PM) in a day may be specified as the switching points. Alternatively, the same switching points may be specified in terms of time duration starting with mid-night (i.e., 8 hours, 21 hours and 23 hours). In addition, different switching points may be specified for different days/months/weeks, etc., as desired by a service provider.

In step 250, SSG 150 counts the volume (number of bytes or packets) of traffic in relation to (i.e., up to or from) each switching point. In step 280, SSG 150 sends accounting records containing the counted numbers, for example, to AAA server 140. As the information in the accounting records is in relation to each switching point, the traffic volume in each tariff duration may be computed accurately. The method ends in step 299.

In an embodiment, each accounting record contains a single number from which the traffic volume in each tariff duration may be determined. For example, SSG 150 may send the value of a counter at each switching point, and thus the traffic volume in each switching point may be determined by merely subtracting numbers from two successive accounting records. Alternatively, the counter may be reset at each switching point such that the traffic volume may be provided by a single number in each accounting record.

One problem with such an embodiment(s) is that SSG 150 may need to perform a substantial amount of processing at each switching point, which may be undesirable. An alternative approach at least overcomes such a disadvantage by sending two counts for a traffic volume sought to be measured, as described below with reference to FIG. 3.

5. Multiple Counts

Figure 3:
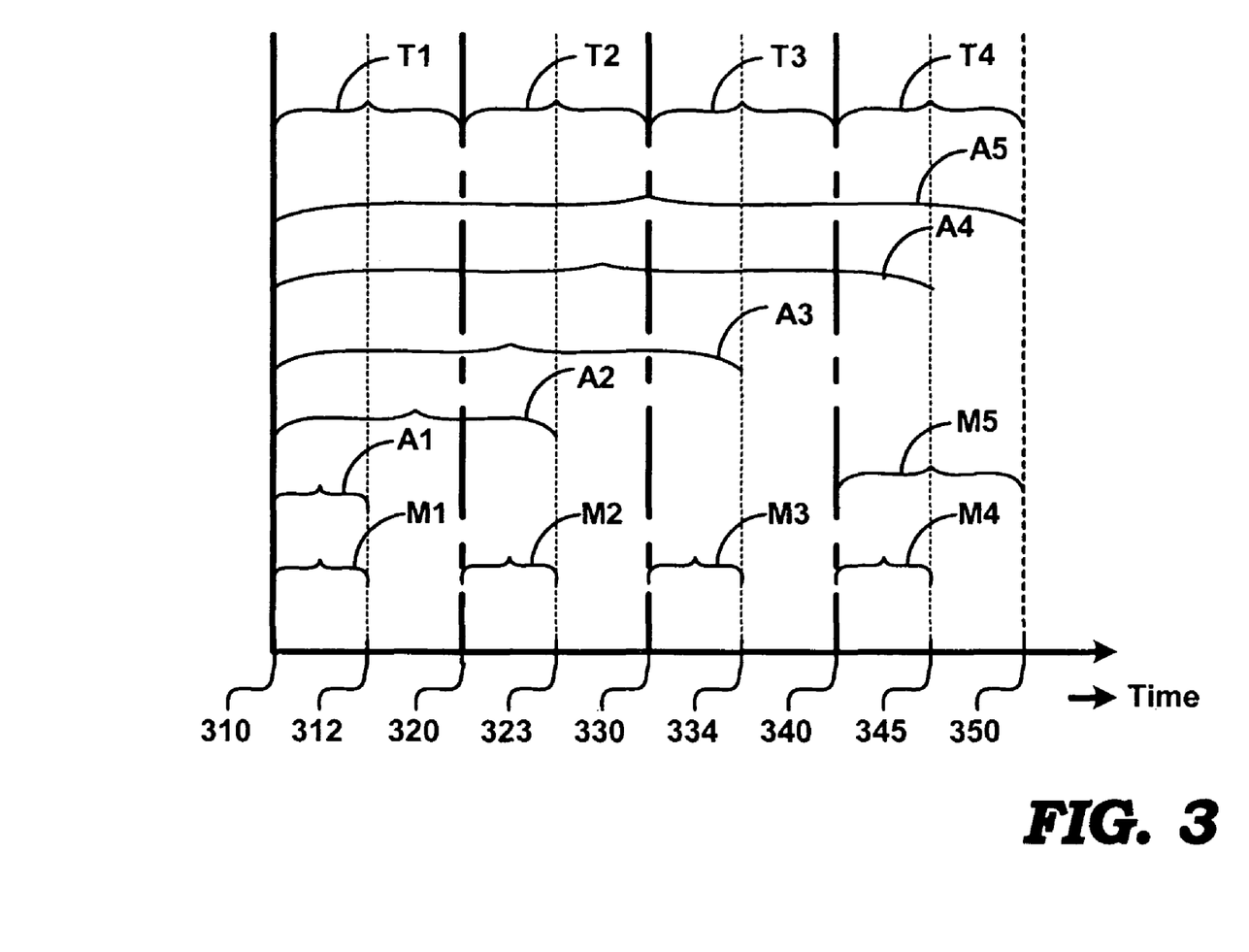
FIG. 3 is a timing diagram illustrating the details of accounting records in an embodiment of the present invention.

FIG. 3 is a timing diagram illustrating the manner in which traffic volume may be accurately measured for each switching point according to an aspect of the present invention. Broadly, in one embodiment, SSG 150 sends two counts associated with each traffic volume (per subscriber, service or connection, as desired), with a first count ("aggregate count") indicating the aggregate number of bytes (or packets) since initialization and the second count indicating the traffic volume since the last switching point.

Continuing with reference to FIG. 3, it is assumed that the tariff data contains three switching points (depicted as broken solid lines) as shown by 320, 330 and 340 for illustration. Thus, the entire time duration contains four tariff durations—first one up to time point 320, the second one between time points 320 and 330, the third one between time points 330 and 340, and the fourth one from time point 340 onwards. It is also assumed that the subscriber is logged on to access a service at time point 310 (before switching point 320) and logged off at time point 350 (after switching point 340).

In operation, SSG 150 sends the two counts at least once in each tariff duration. It is assumed that the two counts are sent at time points 312, 323, 334, 345, and 350 ("accounting points", shown as dotted lines), with the corresponding aggregate counter values being represented by A1–A5 and the marginal counts (counted from a previous switching point) being represented by M1–M5.

AAA server 140 receives the two counts and computes the traffic volume in each tariff duration based on the counts. As may be readily observed, the respective traffic volumes T1–T4 in tariff durations 310–320, 320–330, 330–340, and 340–350 may be computed by the following equations:

$$T1 = A2 - M2 \quad \text{Equation (1)}$$

$$T2 = A3 - M3 - T1 \quad \text{Equation (2)}$$

$$T3 = A4 - M4 - T1 - T2 \quad \text{Equation (3)}$$

$$T4 = M5 \text{ (or) } A5 - T1 - T2 - T3 \quad \text{Equation (4)}$$

It may be observed from the above that the traffic volume for each tariff duration may be accurately determined using the two counts. While the marginal counts (M2, M3, etc.) are described as being counted from a previous switching point, it may be appreciated that the traffic volume for each duration may be determined accurately even if the marginal counts represent counts up to a previous switching point from the time a previous accounting record is sent.

In addition, SSG 150 may enable the counts to be sent only once and at any time point in each tariff duration, which may thus reduce the processing overhead on a SSG.

In general, a packet format is needed to send the counts (or accounting records). Similarly, packet format is needed to send the tariff switching points as well. An example packet is described below in further detail.

6. Packet Formats

In an embodiment, SSG 150 and AAA server 140 exchange packets using RADIUS protocol described in further detail in RFC 2865, noted above. Accordingly, various extensions may be provided within the frame-work of RADIUS protocol to support various features of the present invention, as described below in further detail.

As described in RFC 2865, several attributes may be sent from/to AAA server 140, with potentially several attributes cascaded in sequence in the same packet. Some of the attributes are pre-defined and some can be defined by a vendor (referred to as vendor-specific attributes). With respect to sending aggregate and marginal counts, the pre-defined attributes can be used to send aggregate counter values. However, a vendor specific attribute may need to be defined to send marginal counts and to specify the tariff switching points as described below.

The following packet format may be used for vendor specific attributes:

Byte 1: 26 (to indicate that the attribute is vendor specific)

Byte 2: the length of the attribute in octets

Bytes 3–6: Vendor identifier (Can be set to a value of 0 in the high-order octet (byte 3) and the lower order 3 bytes may be set to a value reflecting SMI Network Management Private Enterprise Code of the vendor in network byte order (e.g., 9 to indicate Cisco Systems, the assignee of the subject patent application) as defined in RFC 1700 entitled, "Assigned Numbers")

Byte 7: Identifier of the attribute (described below)

As relevant to the description above, byte 7 can take on one of two values, one value (e.g., 253) for marginal count and another value (e.g., 251) for data representing the switching points. The remaining packet content depends on whether byte 7 indicates that the attributes relates to marginal count or switching points, as described below with examples.

The remaining packet content for data representing the switching points is described below first.

Byte 8: Length of the present sub-attribute;

Byte 9: Code of 'P' to indicate that the service is a payment type;

Byte 10: Code of 'P' to indicate that the service is a post-paid service;

Byte 11: Code of 'W' to indicate that the tariff data represents a weekly tariff switch plan specification; and Byte 12–23: Weekly tariff switch point/time specified in 'hh:mm:ss:d' format, wherein hh=hour of day <0–23>, mm=minutes <0–59>, ss=seconds <0–59>, and d=bit-map (described below) format for the days of week. The bit map may also be converted into a three digit number, and each digit may be encoded in a byte.

The bit map (d above) represents a value containing seven bits, with each bit specifying whether the switching point is applicable to a corresponding day in the week. Thus, a value "0011111" (=031 decimal) specifies that the switching point is applicable to Monday, Tuesday, Wednesday, Thursday and Friday, assuming that the first bit relates to Saturday. Similarly, tariff data of "PPW00:00:00:127" represents tariff switch time each day a week at midnight. Bytes 12–23 may be repeated as many times as the number of switching points.

With respect to requests related to marginal count, the remaining bytes may be defined as follows:

Byte 8: Length of the present sub-attribute;

Byte 9: set to 'Q' to indicate that the control information code for post-paid service data;

Byte 10: set to 'B' to indicate that the below data indicates traffic volume used since last switching point;

Bytes 11–12: The traffic volume (byte count, number of packets) since the last switching point (specified in the following bytes); and Byte 13 Onwards: The previous tariff switching time/point in Unix time stamp format.

With respect to sending aggregate counter values, the attributes described in RFC 2866 entitled, "RADIUS Accounting", available from the Internet Engineering Task Force, may be used. Similarly, when the service access session(s) are terminated, an accounting stop record containing the final aggregate count and marginal count may be sent.

Merely for simplicity, a traffic volume type (e.g., total bytes transferred) is described as being sent. However, depending on the billing requirements, data representing other types of traffic volume (merely bytes sent or received, or packets sent or received) may also be sent in accounting records. In addition, each accounting record may be sent in one or more IP packets.

Based on the values in the two attributes, AAA server 140 may determine the traffic volume used in each tariff duration and compute the bill based on tariff corresponding to each subscriber. Thus, the packet formats described above can be used to implement various aspects of the present invention. Example embodiments of SSG are described in further detail below.

7. Service Selection Gateway

Figure 4:
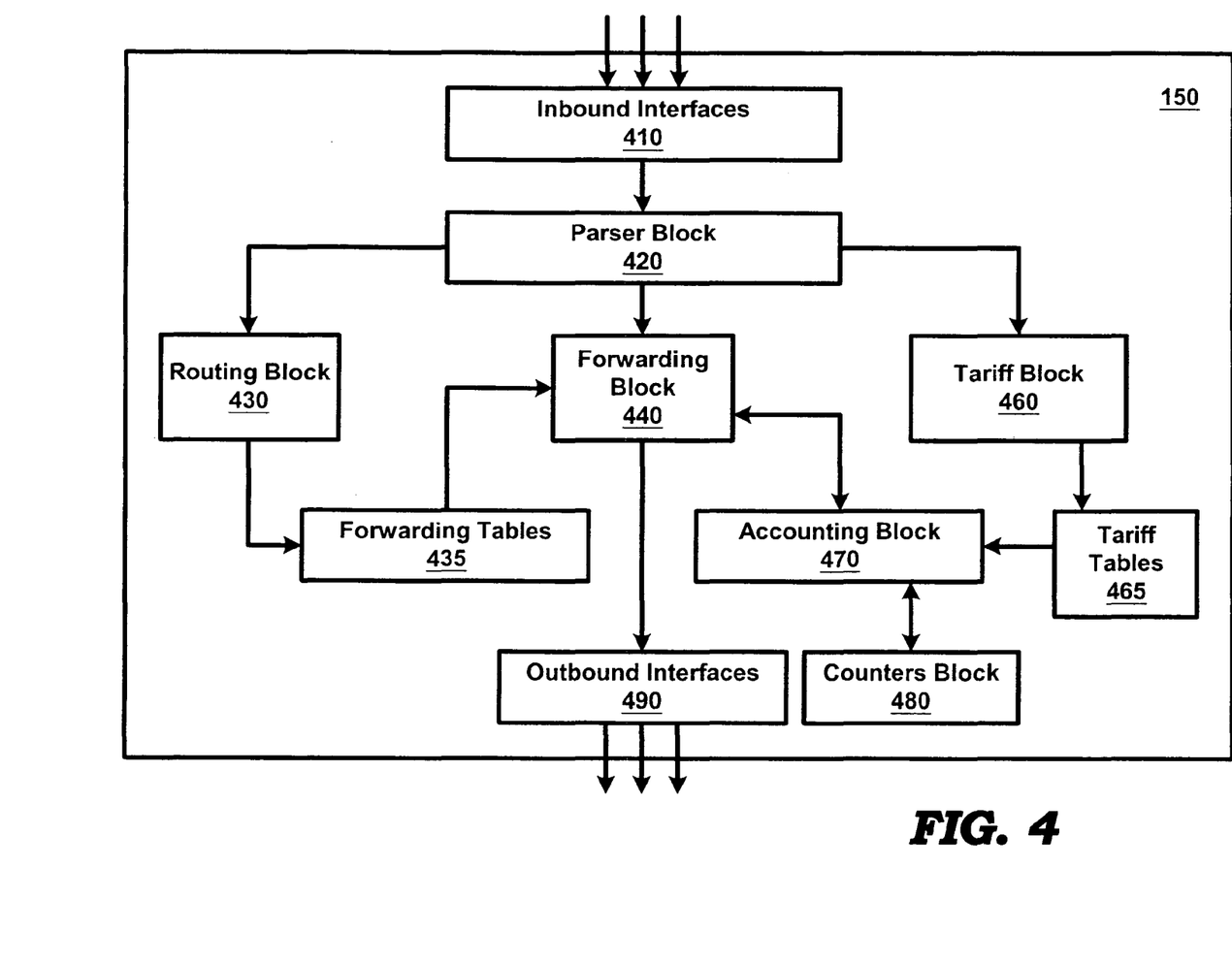
FIG. 4 is a block diagram illustrating the internals of an embodiment of a service selection gateway (SSG) provided in accordance with the present invention.

FIG. 4 is a block diagram illustrating the details of an embodiment of service selection gateway (SSG) 150 as relevant to various aspects of the present invention. SSG 150 is shown containing inbound interfaces 410, parser block 420, routing block 430, forwarding block 440, tariff block 460, tariff tables 465, accounting block 470, counters block 480, and outbound interfaces 490. Each component is described in further detail below.

Inbound interfaces 410 provide the electrical, physical, and protocol interfaces to receive data packets from various subscriber systems, AAA servers, service networks, SESM, etc. The received packets are forwarded to parser block 420 in appropriate format (e.g., IP packets). Similarly, outbound interfaces 490 provide the electrical, physical, and protocol interfaces to send data packets to various subscriber systems, AAA servers, service networks, SESM, etc. Both inbound interfaces 410 and outbound interfaces 490 may be implemented in a known way.

Parser block 420 examines each received packet and forwards the received packets to one of routing block 430, forwarding block 440 and traffic block 460. The specific component to forward to depends generally on the destination address and other header contents. Parser block 420 may be implemented in a known way.

Routing block 430 receives packets related to various routing protocols (OSPF, RIP, etc.) and populates the entries in forwarding tables 435. The entries in forwarding tables 435 may be configured manually as well. In general, the entries specify the manner (next hop address and/or specific interface) in which each IP packet is to be forwarded/processed. Routing block 430 may be implemented in a known way.

Forwarding block 440 receives packets from parser block 420 and accounting block 470, and forwards each received packet based on the destination address contained in the packet. In general, the specific interface on outbound interfaces 490 on which to transmit a packet, is determined by accessing forwarding tables 435.

Tariff block 460 receives packets related to tariff data containing various switching points and populates the entries in tariff tables 465. In general, the entries specify the applicable switching points for different tariffs.

Counters block 480 represents various counters which may need to be maintained to support tariffs according to various aspects of the present invention. In an embodiment, counters block 480 contains two counters for each session/subscriber, with one counter being used for the marginal count and another counter for the aggregate count. An alternative embodiment may be implemented using only a single counter for each session/subscriber as described below.

Accounting block 470 receives information (e.g., byte count, source IP address, destination IP address, etc.) on various packets, and updates the corresponding counters in counters block 480. Also, the counter values may be sent at any convenient time in each switching duration to facilitate accurate computation of the applicable charges (according to the different tariffs).

In an embodiment in which a counter is maintained associated with each of aggregate count and marginal count, the values in the counters may simply need to be copied and sent in the appropriate format in a corresponding accounting record. Thus, the task of sending accounting records may be simplified, but the computation (and register) overhead of maintaining two counters may be unacceptably high.

Accordingly, in an alternative embodiment, only a single counter is used for the aggregate count, and the value in the counter may be stored in a variable at each switching point. The marginal count may then be computed by subtracting the stored value (in the variable) from the aggregate count at the time of sending an accounting record.

Thus, the embodiment of FIG. 4 can be used to provide flexible billing support as may be desirable in various environments. It should be understood that the different components of an SSG can be implemented in a combination of one or more of hardware, software and firmware. In general, when throughput performance is of primary consideration, the implementation is performed more in hardware (e.g., in the form of an application specific integrated circuit).

When cost is of primary consideration, the implementation is performed more in software (e.g., using a processor executing instructions provided in software/firmware). Cost and performance can be balanced by implementing SSG 150 with a desired mix of hardware, software and/or firmware. An embodiment implemented substantially in software is described below.

8. Software Implementation

Figure 5:
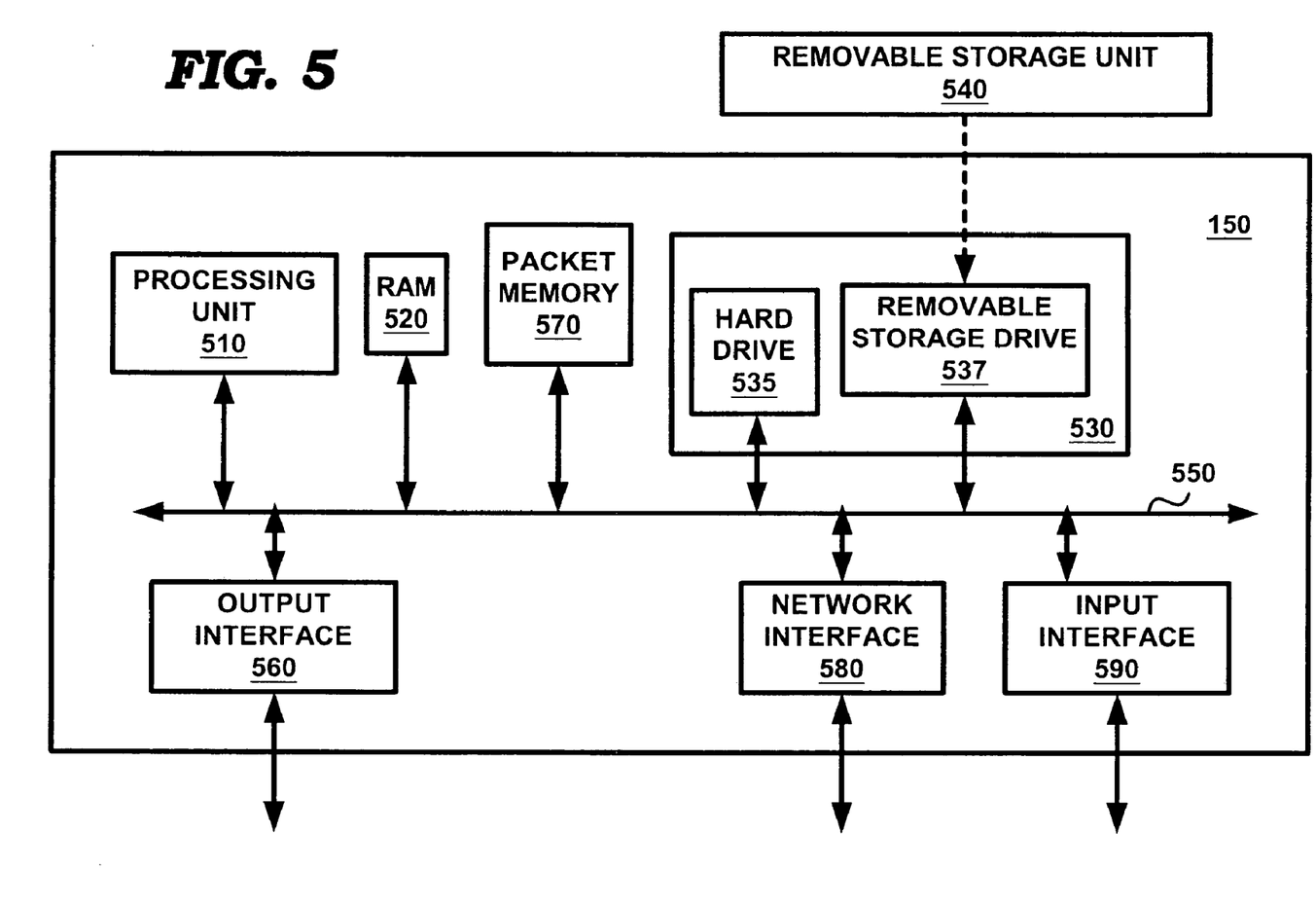
FIG. 5 is a block diagram illustrating the details of an embodiment of a service selection gateway implemented substantially in the form of software according to an aspect of the present invention.

FIG. 5 is a block diagram illustrating the details of SSG 150 in one embodiment. SSG 150 is shown containing processing unit 510, random access memory (RAM) 520, secondary memory 530, output interface 560, packet memory 570, network interface 580 and input interface 590. Each component is described in further detail below.

Input interface 590 (e.g., interface with a key-board and/or mouse, not shown) enables a user/administrator to provide any necessary inputs to SSG 150. Output interface 560 provides output, signals (e.g., display signals to a display unit, not shown), and the two interfaces together can form the basis for a suitable user interface for an administrator to interact with SSG 150.

Network interface 580 may enable SSG 150 to send/receive data packets to/from other systems (110, 120, 130, 140, 170, and 180) on corresponding paths using protocols such as internet protocol (IP). Network interface 580, output interface 560 and input interface 590 can be implemented in a known way.

RAM 520, secondary memory 530, and packet memory 570 may together be referred to as a memory. RAM 520 receives instructions and data on path 550 (which may represent several buses) from secondary memory 530, and provides the instructions to processing unit 510 for execution. In addition, the variables and counters described above may be maintained in the memory.

Packet memory 570 stores (queues) packets waiting to be forwarded (or otherwise processed) on different ports. Secondary memory 530 may contain units such as hard drive 535 and removable storage drive 537. Secondary memory 530 may store the software instructions and data, which enable SSG 150 to provide several features in accordance with the present invention.

Some or all of the data and instructions may be provided on removable storage unit 540 (or from a network using protocols such as Internet Protocol), and the data and instructions may be read and provided by removable storage drive 537 to processing unit 510. Floppy drive, magnetic tape drive, CD-ROM drive, DVD Drive, Flash memory, removable memory chip (PCMCIA Card, EPROM) are examples of such removable storage drive 537.

Processing unit 510 may contain one or more processors. Some of the processors can be general purpose processors which execute instructions provided from RAM 520. Some can be special purpose processors adapted for specific tasks (e.g., for memory/queue management). The special purpose processors may also be provided instructions from RAM 520.

In general, processing unit 510 reads sequences of instructions from various types of memory medium (including RAM 520, storage 530 and removable storage unit 540), and executes the instructions to provide various features of the present invention described above.

It may be appreciated that the features of above may be useful in several situations. For example, a service provider may offer a post-paid service (i.e., subscribers use the service first, and then are charged), which subscribers are charged

9. CONCLUSION

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of supporting a user to access a service, said method being performed in a service selection gateway (SSG), said method comprising:
   receiving in said SSG, data representing a plurality of switching points, each of said plurality of switching points comprising a time point;
   counting in said SSG, a traffic volume from or to each of said plurality of switching points; and
   sending from said SSG, an accounting record containing said traffic volume.

2. The method of claim 1, wherein each of said plurality of switching points comprises a time point at which a tariff changes to access said service.

3. The method of claim 2, wherein said traffic volume comprises an aggregate count of data transferred.

4. The method of claim 2, wherein said traffic volume comprises a marginal count from a previous switching point, said accounting record further comprising an aggregate count.

5. The method of claim 4, further comprising maintaining a marginal counter and an aggregate counter to count said marginal count and said aggregate count respectively.

6. The method of claim 4, further comprising:
   maintaining a single counter to count said aggregate count;
   storing said aggregate count in a variable at each of said plurality of switching points; and
   computing said marginal count at a time of generating said accounting record by subtracting said variable from said aggregate counter at said time.

7. The method of claim 4, wherein said accounting record is sent at least once in every tariff duration, wherein said tariff duration is between successive ones of said plurality of switching points.

8. The method of claim 7, wherein said plurality of switching points are specified for each day.

9. The method of claim 4, wherein said service is billed according to a post-paid model.

10. The method of claim 4, wherein said traffic volume is associated with a session initiated by said user.

11. A machine readable medium carrying one or more sequences of instructions for causing a SSG to support a user to access a service, wherein execution of said one or more sequences of instructions by one or more processors contained in said SSG causes said one or more processors to perform the actions of:
    receiving in said SSG, data representing a plurality of switching points, wherein each of said switching points comprises a time point;
    counting in said SSG, a traffic volume from or to each of said plurality of switching points; and
    sending from said SSG, an accounting record containing said traffic volume.

12. The machine readable medium of claim 11, wherein each of said plurality of switching points comprises a time point at which a tariff changes to access said service.

13. The machine readable medium of claim 12, wherein said traffic volume comprises an aggregate count of data transferred.

14. The machine readable medium of claim 12, wherein said traffic volume comprises a marginal count from a previous switching point, said accounting record further comprising an aggregate count.

15. The machine readable medium of claim 14, further comprising maintaining a marginal counter and an aggregate counter to count said marginal count and said aggregate count respectively.

16. The machine readable medium of claim 14, further comprising:
    maintaining a single counter to count said aggregate count;
    storing said aggregate count in a variable at each of said plurality of switching points; and
    computing said marginal count at a time of generating said accounting record by subtracting said variable from said aggregate counter at said time.

17. The machine readable medium of claim 14, wherein said accounting record is sent at least once in every tariff duration, wherein said tariff duration is between successive ones of said plurality of switching points.

18. The machine readable medium of claim 17, wherein said plurality of switching points are specified for each day of a week.

19. The machine readable medium of claim 14, wherein said service is billed according to a post-paid model.

20. The machine readable medium of claim 14, wherein said traffic volume is associated with a session initiated by said user.

21. A service selection gateway (SSG) supporting a user to access a service, said SSG comprising:
    means for receiving data representing a plurality of switching points wherein each of said switching points comprises a time point;
    means for counting a traffic volume from or to each of said plurality of switching points; and
    means for sending an accounting record containing said traffic volume.

22. The SSG of claim 21, wherein each of said plurality of switching points comprises a time point at which a tariff changes to access said service.

23. The SSG of claim 22, wherein said traffic volume comprises an aggregate count of data transferred.

24. The SSG of claim 22, wherein said traffic volume comprises a marginal count from a previous switching point, said accounting record further comprising an aggregate count.

25. The SSG of claim 24, further comprising means for maintaining a marginal counter and an aggregate counter to count said marginal count and said aggregate count respectively.

26. The SSG of claim 24, further comprising:
means for maintaining a single counter to count said aggregate count;
means for storing said aggregate count in a variable at each of said plurality of switching points; and
means for computing said marginal count at a time of generating said accounting record by subtracting said variable from said aggregate counter at said time.

27. The SSG of claim 24, wherein said accounting record is sent at least once in every tariff duration, wherein said tariff duration is between successive ones of said plurality of switching points.

28. The SSG of claim 27, wherein said plurality of switching points are specified for each day.

29. The SSG of claim 24, wherein said service is billed according to a post-paid model.

30. The SSG of claim 24, wherein said traffic volume is associated with a session initiated by said user.

31. A service selection gateway (SSG) supporting a user to access a service, said SSG comprising:
a tariff block receiving data representing a plurality of switching points, wherein each of said switching points comprises a time point;
a forwarding block forwarding a plurality of packets related to said user; an accounting block counting a traffic volume from or to each of said plurality of switching points according to said plurality of packets; and
an outbound interface sending an accounting record containing said traffic volume.

32. The SSG of claim 31, wherein each of said plurality of switching points comprises a time point at which a tariff changes to access said service.

33. The SSG of claim 32, wherein said traffic volume comprises an aggregate count of data transferred.

34. The SSG of claim 32, wherein said traffic volume comprises a marginal count from a previous switching point, said accounting record further comprising an aggregate count.

35. The SSG of claim 34, wherein said accounting block maintains a marginal counter and an aggregate counter to count said marginal count and said aggregate count respectively.

36. The SSG of claim 34, wherein said accounting block maintains a single counter to count said aggregate count, said accounting block storing said aggregate count in a variable at each of said plurality of switching points, and computing said marginal count at a time of generating said accounting record by subtracting said variable from said aggregate counter at said time.

37. The SSG of claim 34, wherein said accounting record is sent at least once in every tariff duration, wherein said tariff duration is between successive ones of said plurality of switching points.

38. The SSG of claim 37, wherein said plurality of switching points are specified for each day.

39. The SSG of claim 34, wherein said service is billed according to a post-paid model.

40. The SSG of claim 34, wherein said traffic volume is associated with a session initiated by said user.

* * * * *

UNITED STATES PATENT AND TRADEMARK OFFICE
CERTIFICATE OF CORRECTION

PATENT NO.      : 7,136,469 B1
APPLICATION NO. : 10/614611
DATED           : November 14, 2006
INVENTOR(S)     : Vinodh Kumar Ravindranath et al.

It is certified that error appears in the above-identified patent and that said Letters Patent is hereby corrected as shown below:

Col. 4, Line 30, replace "1.00 PM" with --11.00 PM--.

Col. 5, Line 22, replace "taniff" with --tariff--.

Col. 7, Line 51, replace "Tariffblock 460" with --Tariff block 460--.

Col. 8, Line 44, replace "output, signals" with --output signals--.

Col. 9, Line 42/43, replace "switching points, each of said plurality of switching points comprising a time point" with --time points--.

Col. 9, Lines 45, 54, 64 and Col. 10, Lines 4, 6, 21, 32, 43, 50, 52, 65, replace "switching" with --time--.

Col. 9, Line 49 and Col. 11, Line 2 and Col. 12, Line 7, replace "of switching points comprises a time point at which a tariff" with --of time points specifies a corresponding time instance at which a tariff--.

Col. 10, Line 18/19 and Col. 11, Line 35/36 replace "switching points, wherein each of said switching points comprises a time point" with --time points--.

Col. 10, Line 62/63, replace "switching points wherein each of said switching points comprises a time point" with --time points--.

Col. 10, Line 25/26, replace "each of said plurality of switching points comprises a time point" with --each of said plurality of time points specifies a corresponding time instance--.

Col. 11, Lines 7, 18, 25, 27, and Col. 12, Lines 2, 12, 22, 29, 31, replace "switching" with --time--.

UNITED STATES PATENT AND TRADEMARK OFFICE
CERTIFICATE OF CORRECTION

PATENT NO. : 7,136,469 B1
APPLICATION NO. : 10/614611
DATED : November 14, 2006
INVENTOR(S) : Vinodh Kumar Ravindranath et al.

It is certified that error appears in the above-identified patent and that said Letters Patent is hereby corrected as shown below:

After Col. 12, insert the following claims:

Lines 36-38
--41. The SSG of claim 31, wherein said outbound interface is coupled to a plurality of physical paths, wherein said forwarding block examines a header of each of said plurality of packets to determine the specific one of said plurality of physical paths on which to forward each packet, whereby said SSG operates as a switch in forwarding said packets.--

Lines 39-40
--42. The SSG of claim 41, wherein said forwarding block determines said specific one of said plurality of physical paths based on a destination address contained in said header, wherein said SSG operates a router--

Lines 41-44
--43. The method of claim 1, wherein said SSG is coupled to a plurality of physical paths, said method further comprising: receiving a plurality of packets on said plurality of physical paths; examining a header of each of said plurality of paths to determine the specific one of said plurality of physical paths on which to forward the packet; and forwarding each of said plurality of packets on the determined one of said plurality of physical paths, whereby said SSG operates as a switch.--

Signed and Sealed this

Twenty-seventh Day of May, 2008

JON W. DUDAS
*Director of the United States Patent and Trademark Office*